United States Patent
Pamaraju

(10) Patent No.: US 11,619,433 B2
(45) Date of Patent: *Apr. 4, 2023

(54) TEMPERATURE REGULATING REFRIGERATION SYSTEMS FOR VARYING LOADS

(71) Applicant: Laird Thermal Systems, Inc., Morrisville, NC (US)

(72) Inventor: Madhavi Pamaraju, Apex, NC (US)

(73) Assignee: Laird Thermal Systems Inc.

( * ) Notice: Subject to any disclaimer, the term of this patent is extended or adjusted under 35 U.S.C. 154(b) by 0 days.

This patent is subject to a terminal disclaimer.

(21) Appl. No.: 17/559,910

(22) Filed: Dec. 22, 2021

(65) Prior Publication Data
US 2022/0113073 A1    Apr. 14, 2022

Related U.S. Application Data

(63) Continuation of application No. 16/821,647, filed on Mar. 17, 2020, now Pat. No. 11,221,165.
(Continued)

(51) Int. Cl.
F25B 49/02        (2006.01)
F25B 41/20        (2021.01)

(52) U.S. Cl.
CPC .............. *F25B 49/02* (2013.01); *F25B 41/20* (2021.01); *F25B 2339/041* (2013.01);
(Continued)

(58) Field of Classification Search
CPC .. F25B 49/02; F25B 41/20; F25B 2400/0403; F25B 2600/2521; F25B 2600/0261;
(Continued)

(56) References Cited

U.S. PATENT DOCUMENTS 3,734,810 A  *  5/1973  Davis ................... F25B 41/24
                                                  165/240
5,076,068 A     12/1991  Mikhail
(Continued)

FOREIGN PATENT DOCUMENTS

JP      2006153418 A    6/2006
KR      101992781       7/2019

OTHER PUBLICATIONS

Advanced MicroChannel Condensers Product Guide, www.alcoil.net; 2014, 20 pages.
(Continued)

*Primary Examiner* — Kun Kai Ma
(74) *Attorney, Agent, or Firm* — Harness, Dickey & Pierce, P.L.C.; Anthony Fussner

(57) ABSTRACT

A refrigeration system includes a compressor, a condenser, a heat transfer component, and a refrigerant loop arranged to allow a flow of a refrigerant fluid. The compressor, the condenser, and the heat transfer component are connected in the refrigerant loop. The system further includes a bypass path extending between an output side of the compressor in the refrigerant loop and an input side of the heat transfer component in the refrigerant loop. A bypass valve is connected in the bypass path. A control circuit is in communication with the bypass valve. The control circuit is configured to open the bypass valve to allow the refrigerant fluid to pass to the heat transfer component thereby increasing the refrigerant fluid provided to the heat transfer component and artificially increasing a load on the refrigeration system. Other examples refrigeration system and examples methods are also disclosed.

20 Claims, 8 Drawing Sheets

Related U.S. Application Data

(60) Provisional application No. 62/901,661, filed on Sep. 17, 2019.

(52) U.S. Cl.
CPC ............... *F25B 2400/0403* (2013.01); *F25B 2600/0261* (2013.01); *F25B 2600/2521* (2013.01)

(58) Field of Classification Search
CPC ...... F25B 2600/2501; F25B 2400/0411; F25B 2700/1933; F25B 2700/21151; F25B 2600/0253
See application file for complete search history.

(56) References Cited

U.S. PATENT DOCUMENTS

| | | | | |
|---|---|---|---|---|
| 5,168,715 A * | 12/1992 | Nakao | ............... | F25B 49/027 62/181 |
| 5,584,186 A | 12/1996 | Hirano | | |
| 6,311,506 B1 * | 11/2001 | Takahashi | ............... | F25B 41/20 62/201 |
| 7,048,044 B2 | 5/2006 | Ban et al. | | |
| 11,221,165 B2 | 1/2022 | Pamaraju | | |
| 2002/0000094 A1 | 1/2002 | Kuroki | | |
| 2004/0244394 A1 | 12/2004 | Nakayama | | |
| 2008/0006044 A1 * | 1/2008 | Tan | ............... | F25B 49/02 62/197 |
| 2013/0025306 A1 | 1/2013 | Matsukura et al. | | |
| 2015/0107283 A1 | 4/2015 | Xu | | |
| 2017/0030621 A1 | 2/2017 | Hung | | |
| 2018/0029436 A1 | 2/2018 | Zaeri | | |
| 2019/0360731 A1 * | 11/2019 | Dixit | ............... | F25B 41/24 |

OTHER PUBLICATIONS

Axial Fans; https://www.ebmpapst.us/en/products/axial_fans.php; copyright 2019; 11 pages.

Masterflux—Tecumseh Products Company, LLC.; https://www.tecumseh.com/en/na/arcive/masterflux/, Copyright 2018; 2 pages.

Alfa Laval AC16/ACH16; www.alfalaval.com; accessed Oct. 1, 2019; 2 pages.

International Search Report and Written Opinion for PCTUS2020048371 filed Aug. 28, 2020 which claims priority to the instant application; dated Dec. 11, 2020; 10 pages.

* cited by examiner

TEMPERATURE REGULATING REFRIGERATION SYSTEMS FOR VARYING LOADS

CROSS-REFERENCE TO RELATED APPLICATIONS

This application is a continuation of U.S. patent application Ser. No. 16/821,647 filed Mar. 17, 2020 (published as US2021/0080162 on Mar. 18, 2021 and issuing as U.S. Pat. No. 11,221,165 on Jan. 11, 2022). U.S. patent application Ser. No. 16/821,647 claims the benefit and priority of U.S. Provisional Patent Application 62/901,661 filed Sep. 17, 2019. The entire disclosures of the above applications are incorporated herein by reference.

FIELD

The present disclosure relates to temperature regulating refrigeration systems for varying loads.

BACKGROUND

This section provides background information related to the present disclosure which is not necessarily prior art.

Refrigeration systems (e.g., chiller systems) commonly experience capacity modulation when loads on the systems vary. In such examples, a refrigeration system may include a fixed or variable speed compressor and a thermostatic expansion valve to control temperature of a coolant in the system. In cases where the refrigeration system includes a variable speed compressor, the speed of the compressor may be reduced and/or the state of the thermostatic expansion valve may be altered when a load on the system decreases (e.g., a low load condition).

DRAWINGS

The drawings described herein are for illustrative purposes only of selected embodiments and not all possible implementations and are not intended to limit the scope of the present disclosure.

Corresponding reference numerals indicate corresponding (though not necessarily identical) parts and/or features throughout the several views of the drawings.

DETAILED DESCRIPTION

Example embodiments will now be described more fully with reference to the accompanying drawings.

As recognized herein, refrigeration systems (e.g., chiller systems, etc.) may compromise their effectiveness when thermal loads vary. At typical thermal loads, compressors in the refrigeration systems may vary their speed for temperature control. For example, as a thermal load decreases on a refrigeration system, the speed of its compressor may also decrease. When the compressor speed drops below a defined revolutions per minute (RPM) threshold, lubricant (e.g., oil, etc.) return to the compressor and system efficiency may reduce.

The exemplary refrigeration systems disclosed herein may set minimum speeds at which their compressors can operate thereby ensuring the speed of the compressors is maintained at desirable levels to prevent a reduction in lubrication and system efficiency. For example, and as further explained herein, the refrigeration systems may include controllable valves that introduce artificial increases in loads on the refrigeration systems to prevent the speed of the compressors from falling below a threshold, and provide precise temperature regulation, control, etc. of cooling mediums (e.g., coolant fluid, etc.) in the refrigeration systems over wide load capacity ranges.

Figure 1:
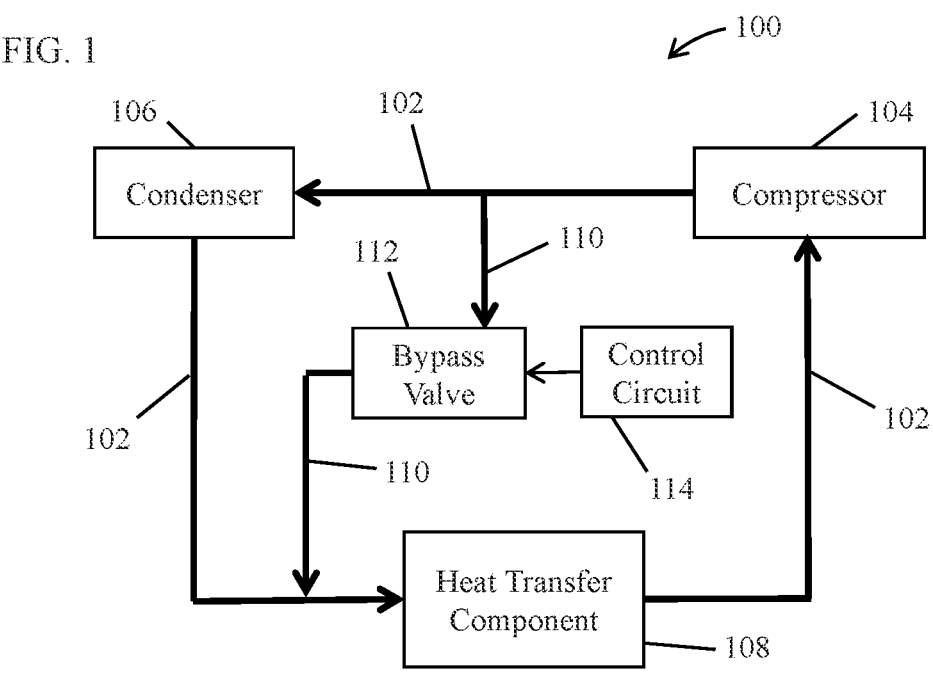
FIG. 1 is a block diagram of a refrigeration system including a controllable bypass valve for introducing an artificial increase in a load on the refrigeration system according to one example embodiment of the present disclosure.

For example, a refrigeration system according to one example embodiment of the present disclosure is illustrated in FIG. 1 and indicated generally by reference number 100. As shown in FIG. 1, the refrigeration system 100 includes a refrigerant loop 102 to allow a flow of a refrigerant fluid, a compressor 104, a condenser 106, a heat transfer component 108, a bypass path 110, a bypass valve 112 connected in the bypass path 110, and a control circuit 114 in communication with the bypass valve 112.

The compressor 104, the condenser 106, and the heat transfer component 108 are connected in the refrigerant loop 102. The refrigerant fluid flowing through the refrigerant loop 102 passes through the compressor 104, the condenser 106, and the heat transfer component 108 such that the refrigerant fluid flows from the compressor 104, to the condenser 106, and then to the heat transfer component 108. For example, the compressor 104 compresses the refrigerant fluid into a gas, the condenser 106 receives and condenses the compressed refrigerant fluid (e.g., gas) from the compressor 104 into a liquid, and the heat transfer component 108 receives the condensed refrigerant fluid from the condenser 106. As shown in FIG. 1, the refrigerant loop 102 forms an enclosed loop.

The bypass path 110 of FIG. 1 extends between an output side of the compressor 104 and an input side of the heat transfer component 108. The bypass path 110 allows the compressed refrigerant fluid (e.g., gas) to pass from the compressor 104 to the heat transfer component 108 via the bypass valve 112. In some examples, the bypass valve 112 (and/or the other bypass valves disclosed herein) may be considered a hot gas bypass valve.

The control circuit 114 controls the state of the bypass valve 112 to allow or not allow the compressed refrigerant fluid to pass from the compressor 104 to the heat transfer component 108. For example, the control circuit 114 may open and/or close the bypass valve 112 when one or more parameters are met. The bypass valve 112 is opened to increase the refrigerant fluid provided to the heat transfer component 108, and artificially increase a load on the refrigeration system 100. As a result, the speed of the compressor 104 may remain substantially steady or increase. As such, the compressor speed may remain at or above desirable levels to prevent a reduction in lubrication and system efficiency.

The control circuit 114 opens and/or closes the bypass valve 112 based on various parameters. For example, the control circuit 114 may open and/or close the bypass valve 112 based on heat transferred from a thermal load component to the system 100, the compressor's speed, temperature (s) in the system 100, etc.

Figure 2:
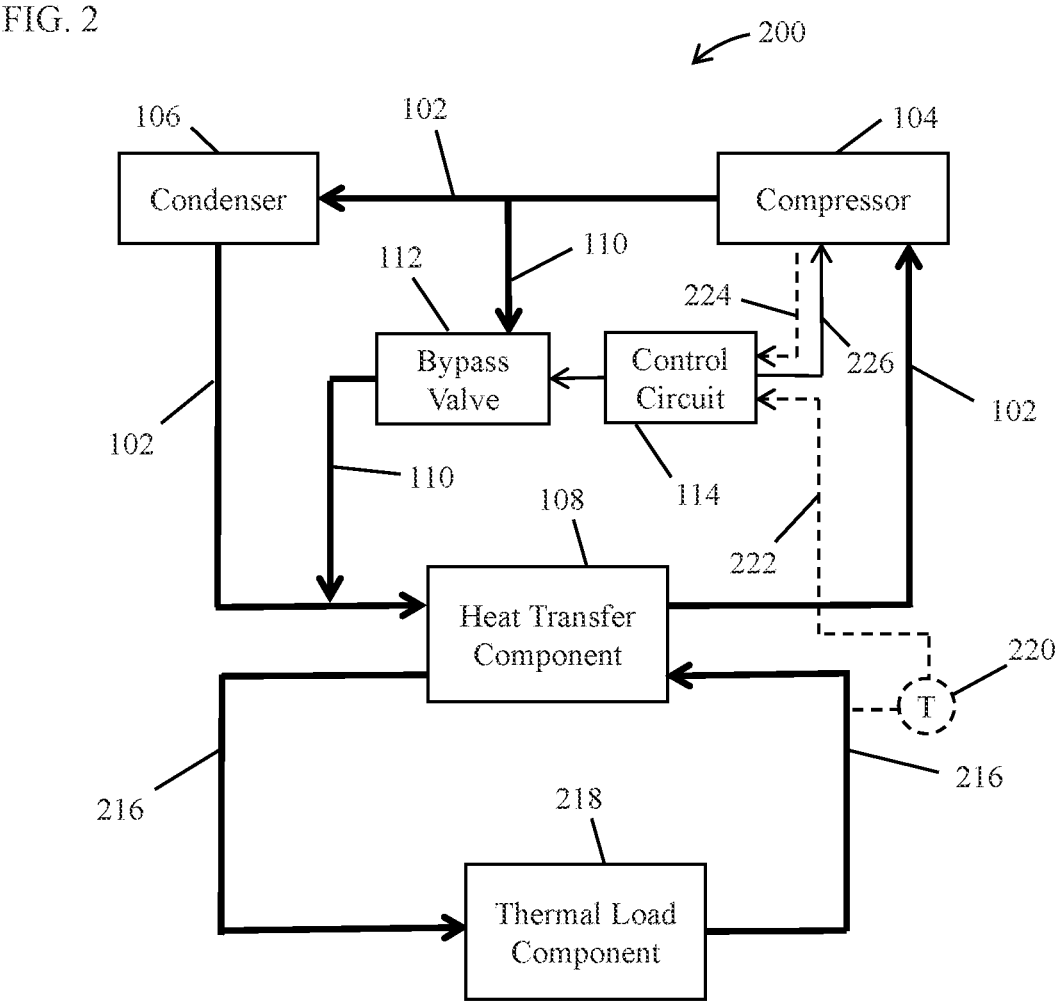
FIG. 2 is a block diagram of a refrigeration system including a compressor and a bypass valve controlled based on a sensed coolant temperature and/or speed of the compressor according to another example embodiment.

In some examples, the refrigeration systems disclosed herein may include a coolant loop in thermal communication with the refrigerant loop 102. For example, FIG. 2 illustrates a refrigeration system 200 substantially similar to the refrigeration system 100 of FIG. 1 but including a coolant loop 216. Specifically, the refrigeration system 200 of FIG. 2 includes the refrigerant loop 102, the compressor 104, the condenser 106, and the heat transfer component 108 of FIG. 1, and the coolant loop 216 to allow a flow of a coolant fluid. As shown in FIG. 2, the heat transfer component 108 is connected in the coolant loop 216 (in addition to the refrigerant loop 102). This allows the heat transfer component 108 to transfer heat from the coolant fluid in the coolant loop 216 to the condensed refrigerant fluid in the refrigerant loop 102.

Additionally, and as shown in FIG. 2, the refrigeration system 200 includes a thermal load component 218 connected in the coolant loop 216. The thermal load component 218 transfers heat (e.g., a load) to the coolant fluid in the coolant loop 216 to cool the thermal load component 218. The amount of heat transferred from the thermal load component 218 (and therefore the load) to the coolant fluid may vary over time depending on, for example, characteristics of the load component 218, operating parameters of the load component 218, surrounding environment, etc. At least some of the heat in the coolant fluid (e.g., heat from the thermal load component 218) is transferred to the condensed refrigerant fluid in the refrigerant loop 102 to cool the coolant fluid in the coolant loop 216. The amount of heat transferred to the refrigerant fluid in the refrigerant loop 102 may depend on, for example, the temperature of the refrigerant fluid. As explained above, the speed of the compressor 104 may vary for controlling the temperature of the refrigerant fluid (and therefore the coolant loop 216). As such, a change in the heat transferred from the thermal load component 218 may result in a change in the compressor's speed.

In some examples, the control circuit 114 of FIG. 2 may control a state of the bypass valve 112 based on a temperature of the coolant fluid in the coolant loop 216. For example, and as shown in FIG. 2, the system 200 may include a temperature sensor 220 in communication (e.g., a wireless and/or wired connection) with the control circuit 114. The temperature sensor 220 is connected in the coolant loop 216 for sensing the temperature of the coolant fluid. The temperature sensor 220 may send one or more signals (the dashed line 222 of FIG. 2) representing the sensed temperature to the control circuit 114. As such, the control circuit 114 may determine the temperature of the coolant fluid (e.g., based on the received signals from the temperature sensor 220), and open and/or close the bypass valve 112 based on the determined temperature. For example, the control circuit 114 may open the bypass valve 112 in response to the determined temperature being less than or equal to a defined temperature threshold (e.g., a setpoint temperature).

Additionally, and/or alternatively, the control circuit 114 may control the state of the bypass valve 112 based on a speed of the compressor 104. For example, the control circuit 114 may receive one or more signals (the dashed line 224 of FIG. 2) representing the speed of the compressor 104. In some examples, the compressor 104 may include and/or be in communication with a tachometer for measuring the RPM of the compressor 104. The control circuit 114 may receive these signals via a wireless connection and/or wired connection. The control circuit 114 may determine a speed of the compressor 104 (e.g., based on the received signals), and open and/or close the bypass valve 112 based on the determined speed. For example, the control circuit 114 may open the bypass valve 112 in response to the determined speed being less than or equal to a defined speed threshold.

In other examples, the control circuit 114 of FIG. 2 may control a state of the bypass valve 112 based on the heat transferred from the thermal load component 218. For example, if the amount of heat transferred (e.g., the load) from the thermal load component 218 is reduced, the compressor 104 may begin to decrease its speed accordingly. However, if the control circuit 114 detects the reduction of the heat transferred from the thermal load component 218, the control circuit 114 may open the bypass valve 112 to increase the refrigerant fluid provided to the heat transfer component 108, and artificially increase the load on the system 200, as explained above.

Figure 3:
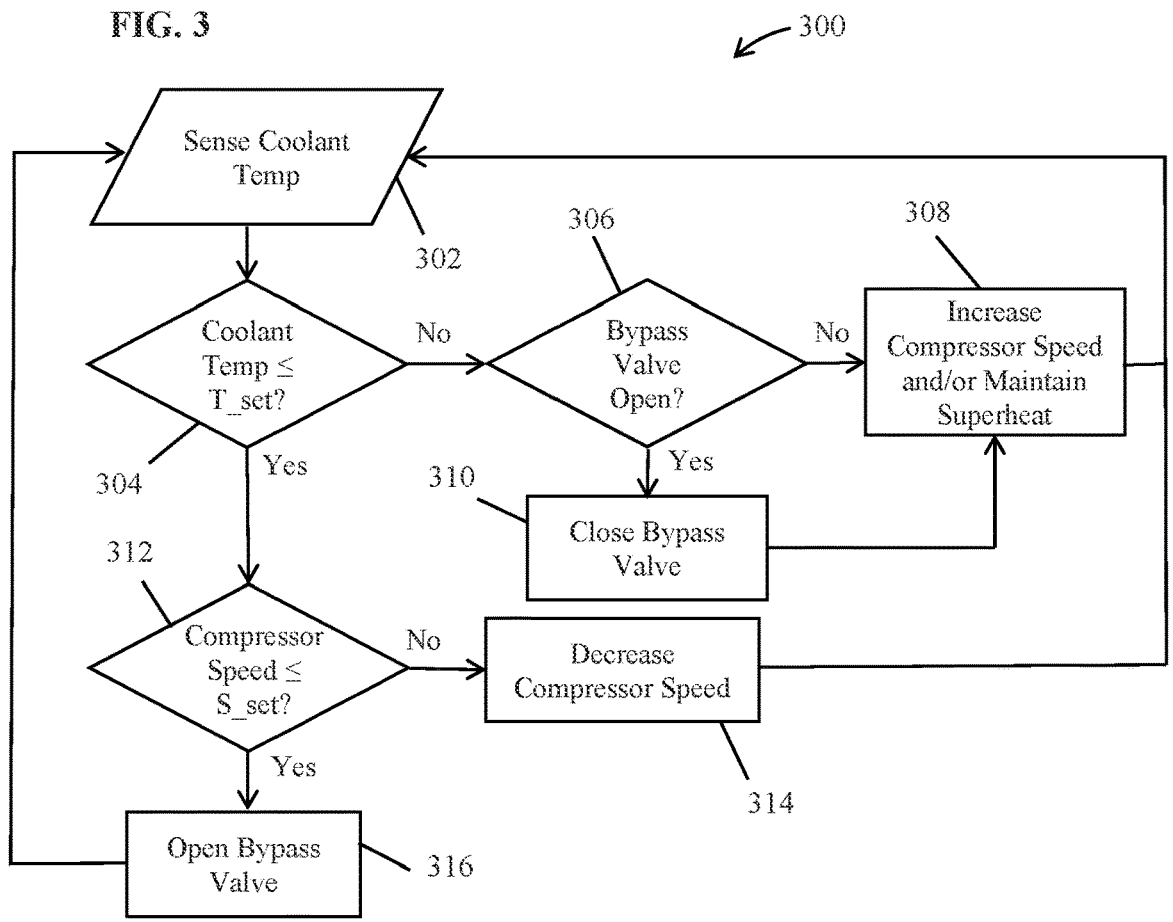
FIG. 3 is a flow diagram of a control process for controlling the bypass valve shown in FIG. 2 according to yet another example embodiment.

FIG. 3 illustrates an example control process 300 of the control circuit 114 of FIG. 2 for controlling the state of the bypass valve 112. As shown in FIG. 3, the process 300 begins by sensing a temperature of the coolant fluid (e.g., via the temperature sensor 220) in block 302, and comparing the sensed temperature of the coolant fluid to a defined temperature threshold (e.g., a setpoint temperature) T_set in block 304. If the sensed temperature of the coolant fluid is greater than the defined temperature threshold T_set, the control circuit 114 determines if the bypass valve 112 is open in block 306. If the bypass valve 112 is closed, the speed of the compressor 104 may be increased and/or a superheat condition of the refrigerant fluid in the refrigerant loop 102 may be maintained (as further explained below) in block 308, and the process 300 returns to sensing a temperature of the coolant fluid in block 302. The speed of the compressor 104 and/or the superheat condition may be controlled by the control circuit 114 if desired. For example, and as shown in FIG. 2, the control circuit 114 may provide a control signal 226 to the compressor 104 to control the speed of the compressor 104. In such examples, a compressor drive speed input signal may adjust the power output to the compressor 104 based on the control signal 226 to increase and/or decrease the speed of the compressor 104.

In some examples, the control circuit 114 may close the bypass valve 112 in response to the determined temperature being greater than the defined temperature threshold T_set. For example, and as shown in FIG. 3, if the control circuit 114 determines the sensed temperature of the coolant fluid is greater than the defined temperature threshold T_set in block 304, and the bypass valve 112 is open in block 306, the control circuit 114 may close the bypass valve 112 in block 310. After which, the speed of the compressor 104 may be increased and/or the superheat condition of the refrigerant fluid may be maintained in block 308. The process 300 then returns to sensing a temperature of the coolant fluid in block 302.

If the control circuit 114 determines that the sensed temperature of the coolant fluid is less than or equal to the defined temperature threshold T_set in block 304, the control circuit 114 compares a determined speed of the compressor 104 with a defined speed threshold S_set in block 312. If the determined compressor speed is greater than the defined speed threshold S_set, the speed of the compressor 104 is decreased in block 314, and the process 300 returns to sensing a temperature of the coolant fluid in block 302. Alternatively, the control circuit 114 determines the speed of the compressor is less than or equal to the defined speed threshold S_set, the bypass valve 112 is opened in block 316. After which, the process 300 returns to sensing a temperature of the coolant fluid in block 302.

Figure 4:
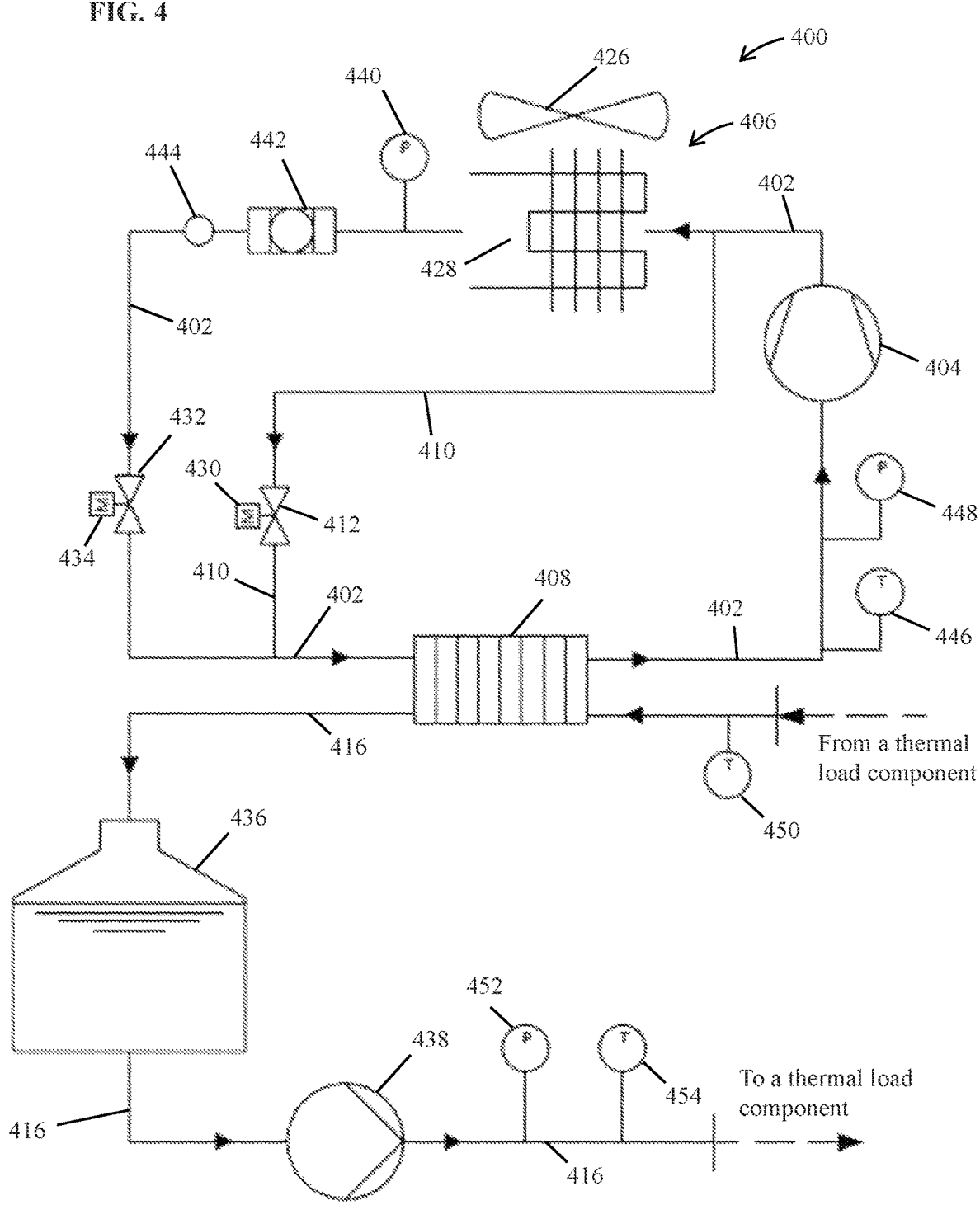
FIG. 4 is a schematic diagram of a refrigeration system including a compressor, a bypass valve, and an expansion valve according to another example embodiment.
Figure 6:
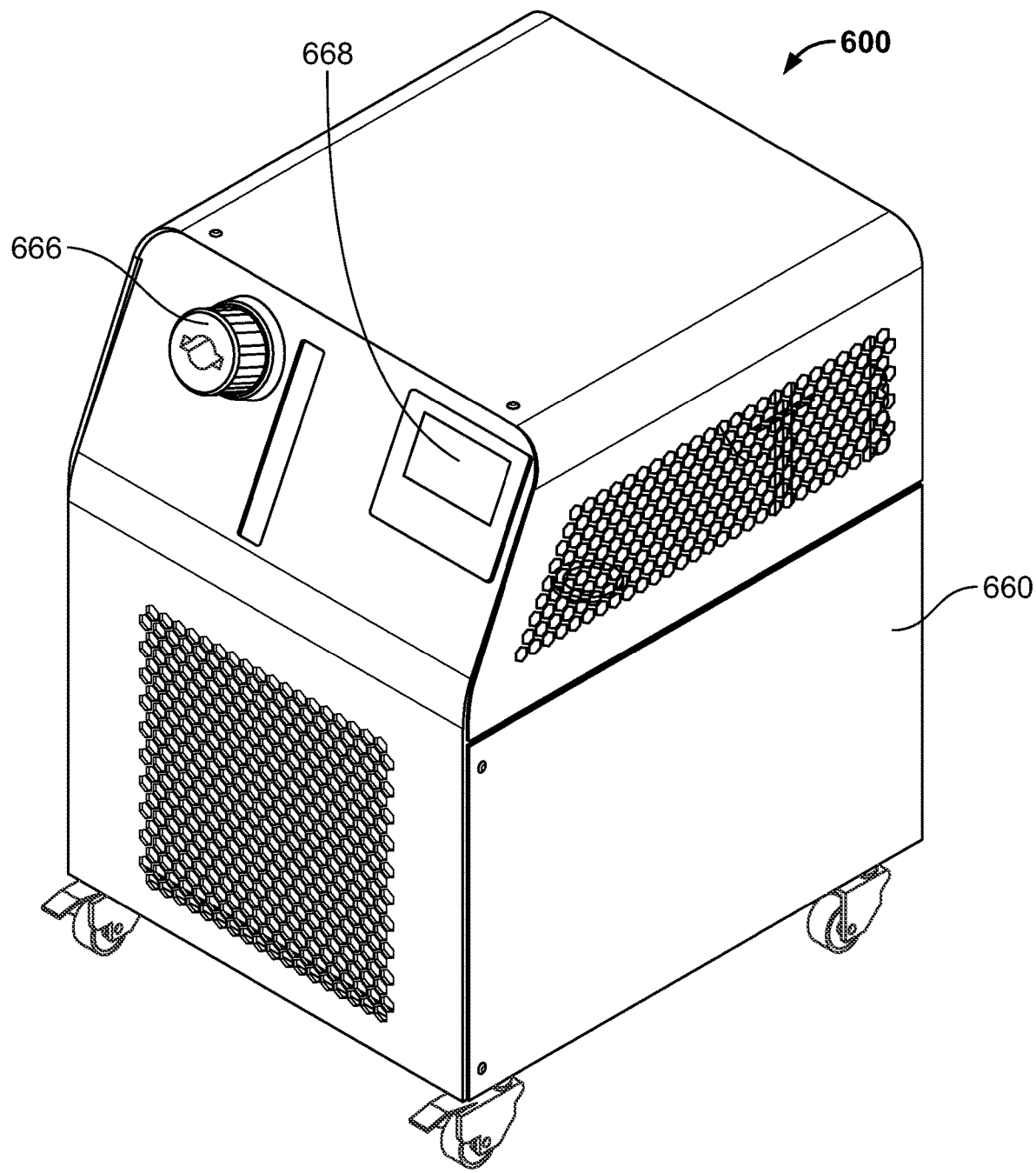
FIG. 6 is a front isometric view of a refrigeration system including the compressor, the bypass valve and the expansion valve shown in FIG. 4 according to another example embodiment.
Figure 7:
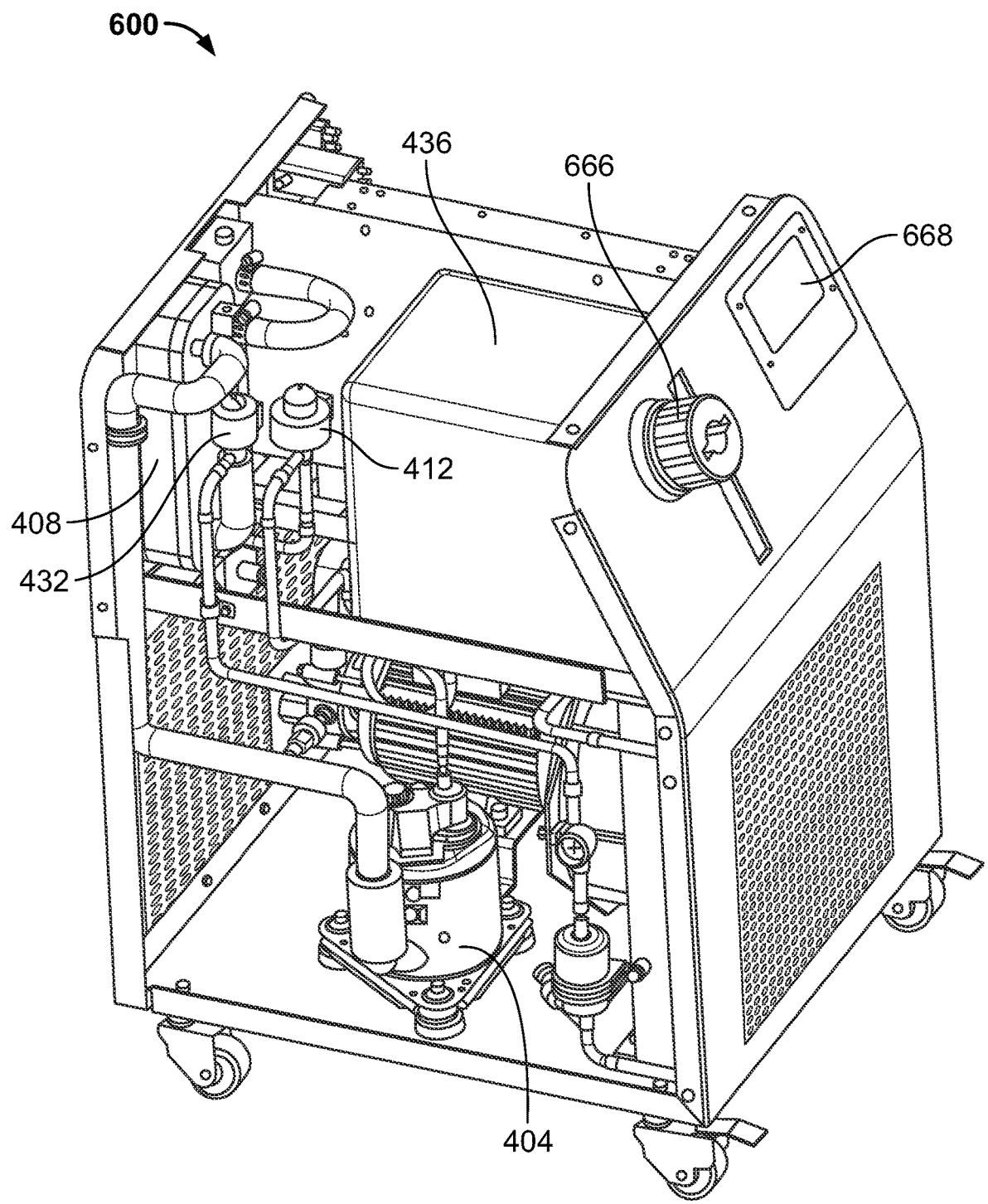
FIG. 7 is a left side front isometric view of the refrigeration system shown in FIG. 6.

FIG. 4 illustrates a refrigeration system 400 similar to the refrigeration system 200 of FIG. 2 but including an evaporator as a heat transfer component. For example, the refrigeration system 400 includes a refrigerant loop 402, a compressor 404, a condenser 406, an evaporator 408, a bypass path 410, and a bypass valve 412 connected in the bypass path 410. As shown, the compressor 404, the condenser 406, and the evaporator 408 are connected in the refrigerant loop 402.

Additionally, and as shown in FIG. 4, the refrigeration system 400 includes a coolant loop 416 in thermal communication with the refrigerant loop 402, a coolant tank 436, and a pump 438. The coolant tank 436 and the pump 438 are connected in the coolant loop 416. The pump 438 and the coolant tank 436 facilitate cooling of a thermal load component (not shown) connected in the coolant loop 416. The pump 438 generates a coolant fluid flow in the coolant loop 416. The coolant tank 436 is a fluid reservoir that stores coolant fluid as the coolant fluid is cycling through the coolant loop 416. The coolant tank 436 may include a coolant inlet to allow a user to add coolant fluid if desired.

The refrigerant loop 402 and the coolant loop 416 are similar to the refrigerant loop 102 and the coolant loop 216 explained above. For example, the evaporator 408 is connected in both the refrigerant loop 402 and the coolant loop 416, and transfers heat from a coolant fluid in the coolant loop 416 to a refrigerant fluid in the refrigerant loop 402. The coolant fluid is circulated through the thermal load component so that the thermal load component may transfer heat (e.g., a load) to the coolant fluid in the coolant loop 416 to cool the thermal load component.

The bypass valve 412 of FIG. 2 is similar to the bypass valve 112 of FIGS. 1 and 2. For example, the bypass valve 412 may be controlled by a process similar to the control process 300 of FIG. 3. As such, a control circuit (e.g., the control circuit 114 of FIGS. 1 and 2, etc.) may open the bypass valve 412 to allow compressed refrigerant fluid in the refrigerant loop 402 to pass to the evaporator 408 via the bypass path 410 thereby increasing the refrigerant fluid provided to the evaporator 408 and artificially increasing a load on the refrigeration system (e.g., the compressor 404). In such examples, the control circuit may control the bypass valve 412 based on a determined (e.g., sensed, etc.) temperature of the coolant fluid in the coolant loop 416, a speed of the compressor 404, etc. as explained above.

As shown in FIG. 4, the refrigeration system 400 further includes an expansion valve 432 connected in the refrigerant loop 402 between the condenser 406 and the evaporator 408. Specifically, the expansion valve 432 is connected between the output of the condenser 406 and a point where the bypass path 410 meets the refrigerant loop 402. In the example of FIG. 4, the expansion valve 432 may be an electronic expansion valve. As such, the expansion valve 432 may be controlled by a control circuit, as further explained below. In some examples, the same control circuit or different control circuits may be employed to control one or more of the compressor 404, the bypass valve 412 and/or the expansion valve 432.

Additionally, the refrigeration system 400 may optionally include various sensing devices for sensing, detecting, etc. parameters of the system 400. Some of the sensors may be connected in and/or in communication with the refrigerant loop 402, and other sensors may be connected in and/or in communication with the coolant loop 416. Data from one or more of the sensing devices may be used in controlling the compressor 404, the bypass valve 412 and/or the expansion valve 432 as explained herein.

For example, and as shown in FIG. 4, the system 400 includes temperature sensors 446, 450, 454, pressure sensors 440, 448, 452, and a moisture sensor 444. The temperature sensor 446 is positioned on the suction side (e.g., the input side) of the compressor 404 for sensing a temperature in the refrigerant loop 402, the temperature sensor 450 is positioned on the return side of the thermal load component, and the temperature sensor 454 is positioned on the supply side of the thermal load component. The pressure sensor 440 is positioned on the output side of the condenser 406 for sensing a pressure level of the condensed refrigerant fluid, the pressure sensor 448 is positioned on the suction side of the compressor 404 for sensing a pressure level of the refrigerant fluid on the input side of the compressor 404, and the pressure sensor 452 is positioned on the supply side of the thermal load component for sensing a pressure level of the coolant fluid provided to the thermal load component. The moisture sensor 444 is positioned on the output side of the condenser 406 for detecting moisture in the condensed refrigerant fluid.

Further, the refrigeration system 400 may optionally include one or more devices for drying, filtering, etc. fluid in the system 400. For example, the refrigeration system 400 of FIG. 4 includes a combined drying and filtering device 442. As shown, the device 442 is connected in and/or in communication with the refrigerant loop 402 between the moisture sensor 444 and the output side of the condenser 406. The device 442 may filter containments and/or remove moisture in the condensed refrigerant fluid provided by the condenser 406.

Figure 5:
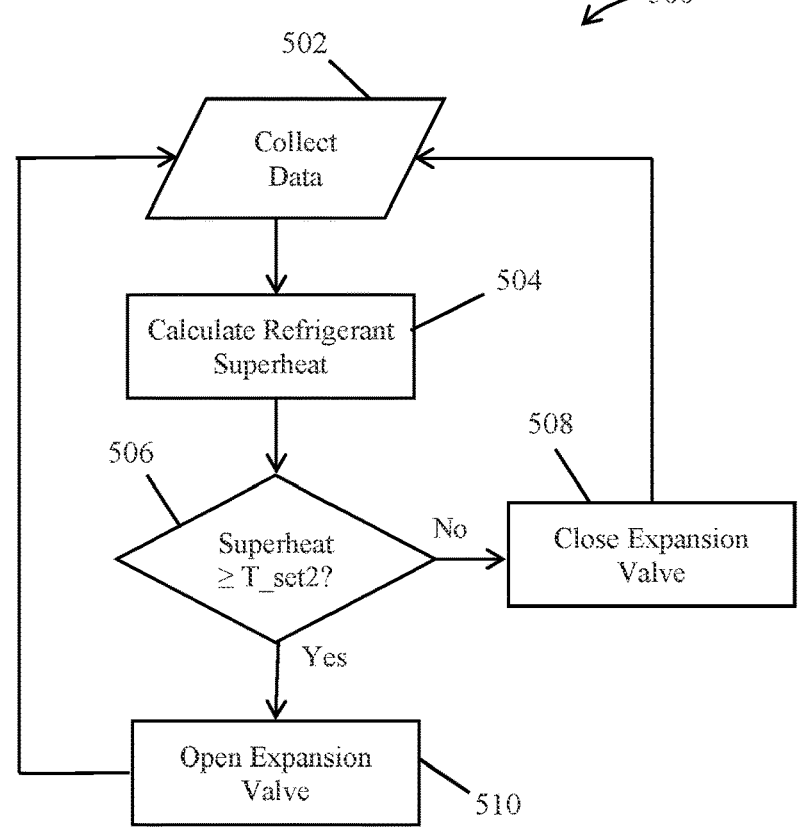
FIG. 5 is a flow diagram of a control process for controlling the expansion valve shown in FIG. 4 according to yet another example embodiment.

The state of the expansion valve 432 may be controlled based on one or more parameters of the refrigeration system 400. For example, FIG. 5 illustrates a control process 500 of a control circuit for controlling the state of the expansion valve 432. As shown in FIG. 5, the process 500 begins by collecting data in block 502. The collected data may relate to parameters of the refrigeration system 400 such as temperatures, pressure levels, etc. For example, the control circuit may determine a temperature on the suction side of the compressor 404 based on one or more signals from the temperature sensor 446, a pressure level on the suction side of the compressor 404 based on one or more signals from the pressure sensor 448, a refrigerant saturation temperature, etc. The refrigerant saturation temperature may be determined (e.g., calculated, etc.) by the control circuit based on thermodynamic properties of the system 400, stored lookup tables, etc.

After the data is collected in block 502, the control circuit may calculate the superheat of the refrigerant fluid in block 504. For example, the superheat may be calculated by subtracting the refrigerant saturation temperature from the suction side temperature, both of which are determined in block 502. The control circuit then compares the calculated superheat with a defined temperature threshold T_set2 in block 506. The defined temperature threshold T_set2 may be set to a determined superheat value that may vary for different refrigeration systems. For example, the superheat represents the additional temperature to which a refrigerant is heated beyond its saturated vapor temperature. Saturated vapor temperature is the temperature where all of the liquid refrigerant is converted to vapor. This ensures that only vapor refrigerant enters the compressor. The defined temperature threshold T_set2 may be set to any suitable value based on characteristics of its corresponding refrigeration system. For example, the defined temperature threshold T_set2 may be 10° C., 15° C., etc.

If the superheat is less than the temperature threshold T_set2 in block 506, the control circuit may close the expansion valve 432 in block 508. Alternatively, if the superheat is greater than or equal to the temperature threshold T_set2 in block 506, the control circuit may open the expansion valve 432 in block 510. After the expansion valve 432 is opened or closed, the process 500 returns to collecting data in block 502.

The valves disclosed herein may be opened and/or closed by motors that are controlled by a control circuit (e.g., the control circuit 114 of FIGS. 1 and 2, etc.). For example, and as shown in FIG. 4, the refrigeration system 400 may optionally include motors 430, 434 in communication with the valves 412, 432, respectively, and the control circuit referenced above relative to FIG. 4. In such examples, the motors 430, 434 may change the state of the valves 412, 432 when instructed by the control circuit.

In some examples, the valves may be fully opened, fully closed, partially opened and/or partially closed. In such examples, the motors 430, 434 may be stepper motors that move the valves 412, 432 open and/or close in steps. As such, the motor 430 may be controlled to partially open the bypass valve 412 if a coolant temperature and a compressor speed conditions are met (e.g., as described above relative to blocks 304, 312 of FIG. 3), further open the bypass valve 412 if the coolant temperature and the compressor speed conditions are met again, partially close the bypass valve 412 if another coolant temperature condition is met, further close the bypass valve 412 if the other coolant temperature condition is met again, etc. Likewise, the motor 434 may be controlled to partially open the expansion valve 432 if a superheat condition is met (e.g., as described above relative to block 506 of FIG. 5), further open the expansion valve 432 if the superheat condition is met again, partially close the expansion valve 432 if another superheat condition is met, further close the expansion valve 432 if the other superheat condition is met again, etc. This may allow for more precise control over the amount of compressed refrigerant fluid flowing through the bypass path 410 and/or the amount of refrigerant fluid flowing through the refrigerant loop 402.

Figure 8:
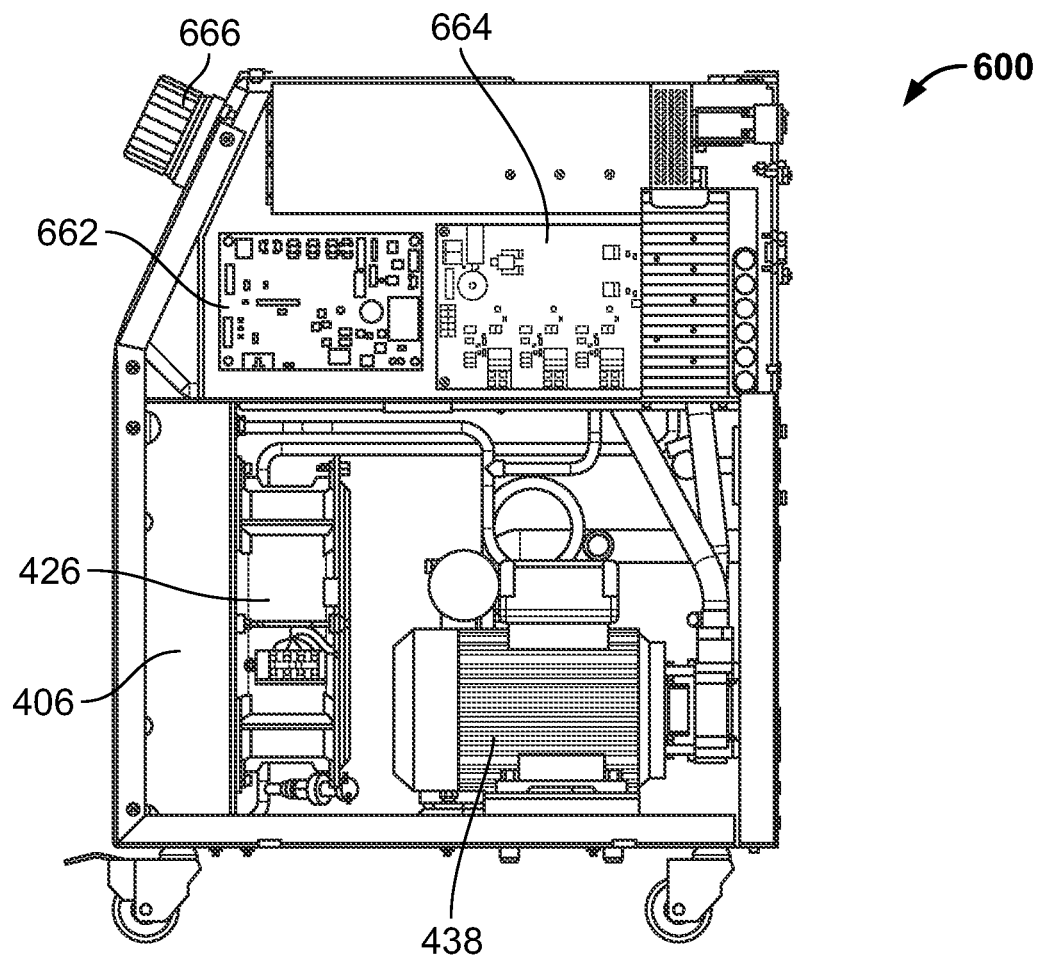
FIG. 8 is a right side view of the refrigeration system shown in FIG. 6.

FIGS. 6-9 illustrate a refrigeration system 600 including the components of the refrigeration system 400 of FIG. 4 housed in an enclosure 660. For example, and as shown in FIGS. 6-9, the compressor 404, the condenser 406, the evaporator 408, the bypass valve 412, the expansion valve 432, the coolant tank 436, and the pump 438 of FIG. 4 are positioned in the enclosure 660. Additionally, and as shown in FIG. 8, the refrigeration system 600 includes a control board 662 (e.g., a printed circuit board) and a power board 664 for controlling and powering components in the system 600. For example, the power board 664 may include a variable-frequency drive (VFD) and/or another suitable drive for powering the compressor 404. Additionally, the control board 662 may include control circuitry for controlling the bypass valve 412, the expansion valve 432 and the compressor 404 (e.g., via the VFD), as explained herein.

As shown in FIGS. 6-9, the refrigeration system 600 may include various optional components, such as a coolant inlet 666, a display 668, and connections for coupling to a thermal load component (not shown), etc. For example, the coolant inlet 666 is in fluid communication with the coolant tank 436 for allowing a user to add coolant fluid if desired. The display 668 may provide user data, characteristics of the system 600, etc. In some examples, the display 668 may include a touch screen for receiving user input such as system parameters, etc. The connections for coupling to the thermal load component include an inlet 670 for receiving the coolant fluid from the thermal load component and outlet 672 for providing the coolant fluid to the thermal load component.

Figure 9:
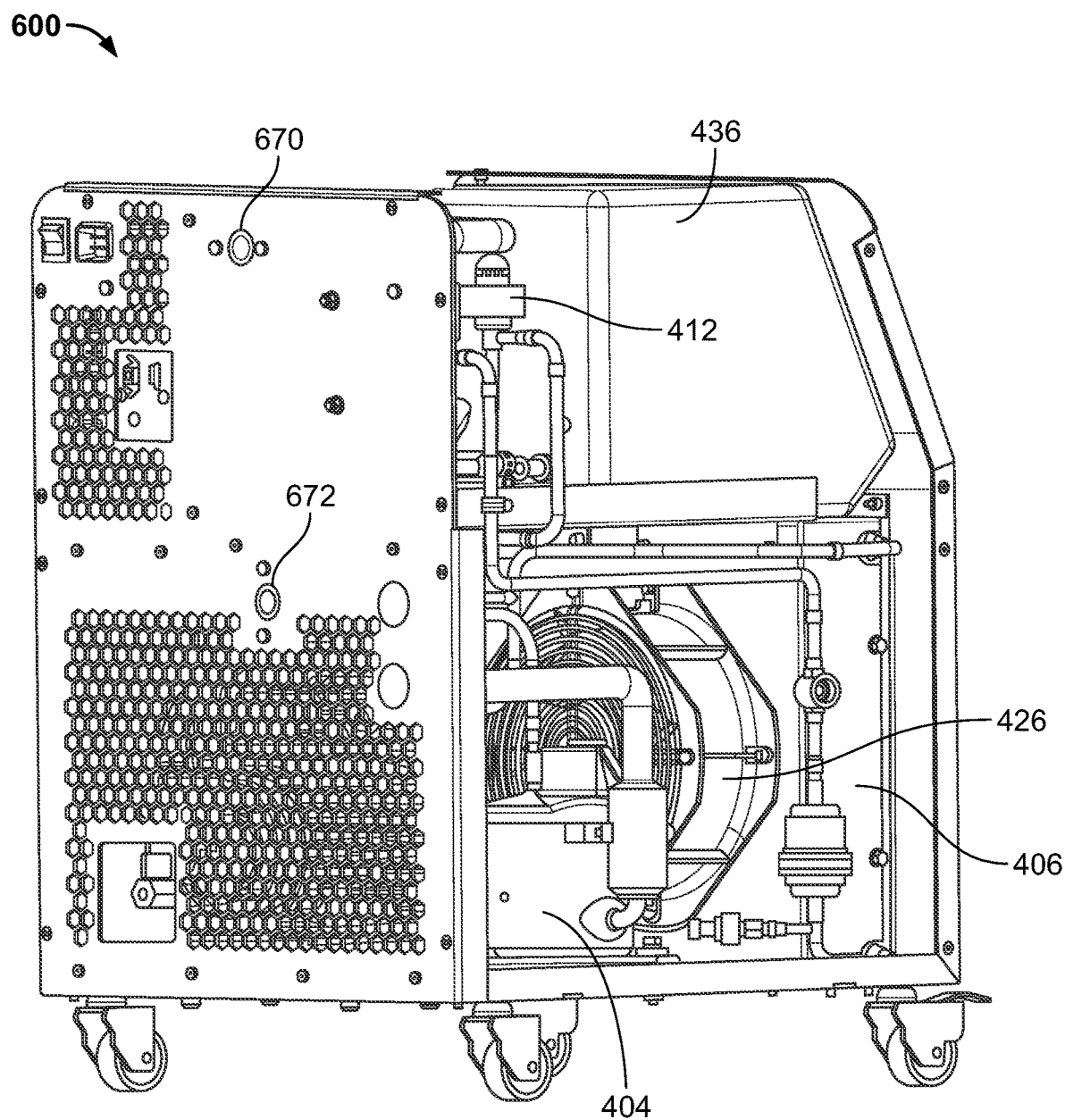
FIG. 9 is a left side rear isometric view of the refrigeration system shown in FIG. 6.

The condensers disclosed herein may be any suitable condenser. In some examples, the condensers may include one or more coils and fans. For example, the condenser 406 includes coils 428 and a fan 426, as shown in FIGS. 4, 8 and 9. In such examples, the fan 426 may push or pull air through the coils to cool the refrigerant fluid. The fan 426 may be controlled with the same or a different control circuit that controls other components (e.g., the compressor 404, the bypass valve 412, the expansion valve 432, etc.) in the refrigeration system 400. In some examples, the fan 426 may be an axial fan, and the coils may be formed of aluminum.

The compressors disclosed herein may be any suitable compressor. For example, any one of the compressors may include a variable speed compressor. In such examples, a frequency control (e.g., a VFD, etc.) may be used to vary the speed of the compressor if desired. In some cases, the compressors may be adapted to run substantially continuously due to the valves assisting in substantially maintaining, regulating, controlling, etc. the temperature of the cooling fluid at a setpoint temperature (e.g., a defined temperature threshold). As a result, the number of compressor on/off cycles may be reduced, and the life of the compressors may be extended.

The heat transfer components disclosed herein may be any suitable component capable of transferring heat between a refrigerant loop and a coolant loop. For example, the heat transfer components may transfer heat from the coolant loop to the refrigerant loop to reduce a temperature of the coolant fluid in the coolant loop as explained herein. The heat transfer components may include an evaporator (e.g., the evaporator 408 of FIG. 4), a heat exchanger, etc. In some examples, the evaporator may include a heat exchanger such as brazed plate heat exchanger, etc.

The control circuits disclosed herein may include an analog control circuit, a digital control circuit (e.g., a microprocessor, a microcontroller, a digital signal controller (DSC), a digital signal processor (DSP), etc.), or a hybrid control circuit (e.g., a digital control circuit and an analog control circuit). The control circuits may be configured to perform (e.g., operable to perform, etc.) any of the example processes described herein using any suitable hardware and/or software implementation. For example, any one of the control circuits disclosed herein may include necessary hardware and/or software components for comparing determined (e.g., sensed, etc.) parameters with defined thresholds, controlling the states of valves, etc. In such examples, the control circuits may execute computer-executable instructions stored in a memory, may include one or more logic gates, control circuitry, etc.

By employing any one of the controllable valves disclosed herein, precise temperature control of cooling mediums in the refrigeration systems (e.g., chiller systems, etc.) over wide load capacity ranges may be obtained without compromising compressor lubrication. As such, the refrigeration systems disclosed herein may experience increased system efficiency (e.g., coefficient of performance).

Figure 10:
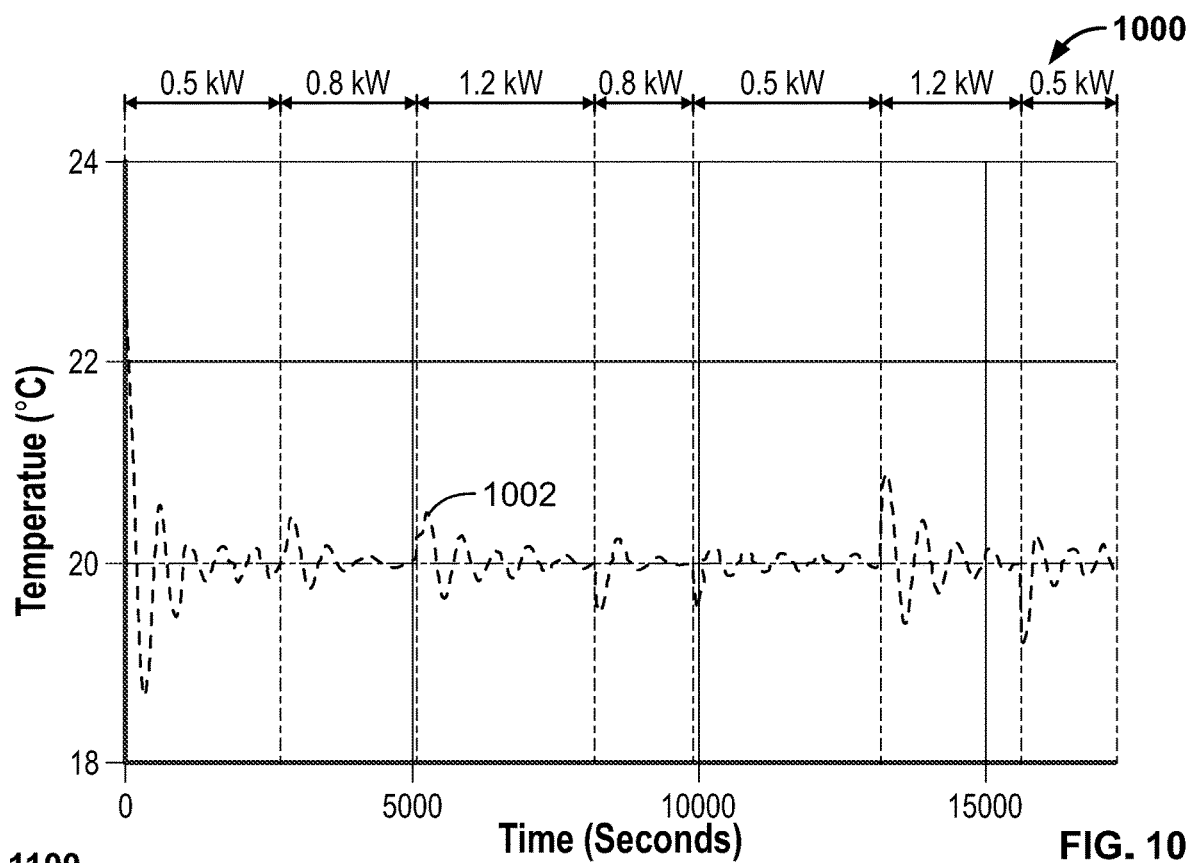
FIG. 10 is a graph of a waveform representing a temperature of a coolant fluid in the refrigeration system shown in FIG. 4 as a load on the system varies over time according to yet another example embodiment.
Figure 11:
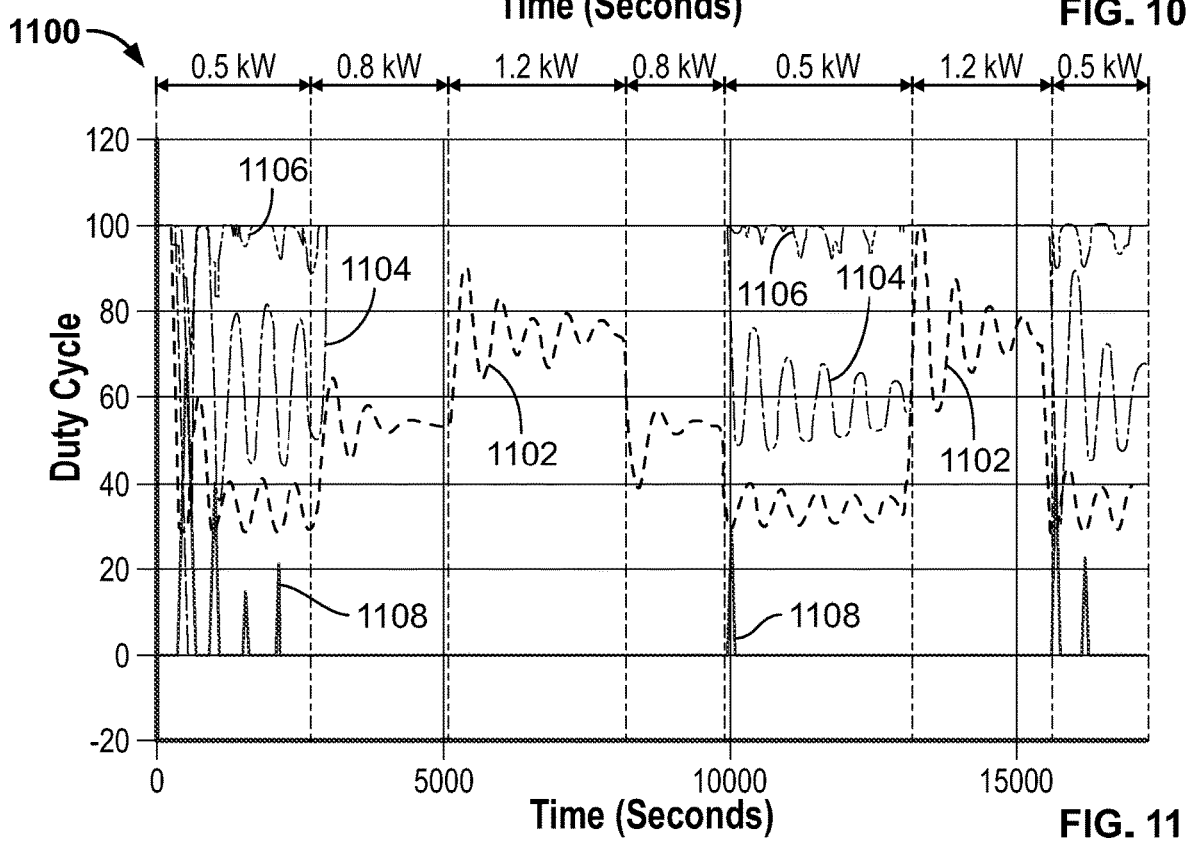
FIG. 11 is a graph of waveforms representing duty cycles of various components in the refrigeration system shown in FIG. 4 as a load on the system varies over time according to another example embodiment.

By way of example, FIGS. 10 and 11 illustrate graphs 1000, 1100 including waveforms representing various parameters of the refrigeration system 400 of FIG. 4 when the load on the system 400 varies over time. Specifically, the graph 1000 of FIG. 10 includes a waveform 1002 representing the temperature (in Celsius) of the coolant fluid in the coolant loop 416. As shown in FIG. 10, the temperature of the coolant fluid remains substantially constant at about 20° C. (e.g., a setpoint temperature) when the load changes between 1.2 kW, 0.8 kW and 0.5 kW.

The graph 1100 of FIG. 11 includes waveforms 1102, 1104, 1106, 1108 representing duty cycles of the compressor 404, the condenser fan 426, the expansion valve 432, and the bypass valve 412 of FIG. 4, respectively. As shown in FIG. 10, when the load drops to 0.5 kW (e.g., from 0.8 kW), the temperature of the coolant fluid falls below the setpoint temperature of 20° C. As a result, the duty cycle of the compressor 404 and the duty cycle of the condenser fan 426 reduce, as shown by the waveforms 1102, 1104 of FIG. 11. As such, the compressor 404 is operated (e.g., turned on) less as the load drops causing the compressor speed to decrease. Additionally, during this time, the expansion valve 432 begins to close in steps and the bypass valve 412 beings to open in steps, as shown by the waveforms 1106, 1108 of FIG. 11. This causes the load on the refrigeration system 400 to artificially increase to prevent the compressor speed to decrease further, as explained herein. As a result, the temperature of the coolant fluid may be controlled at about the setpoint temperature of 20° C., as shown in FIG. 10. When the load reaches 0.8 kW and 1.2 kW, the duty cycle of the compressor 404 and the duty cycle of the condenser fan 426 increase, the expansion valve 432 is open, and the bypass valve 412 is closed, as shown by the waveforms 1102, 1104, 1106, 1108 of FIG. 11.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purposes of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. For example, when permissive phrases, such as "may comprise", "may include", and the like, are used herein, at least one embodiment comprises or includes the feature(s). As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A refrigeration system comprising:
    a refrigerant loop arranged to allow a flow of a refrigerant fluid;
    a compressor connected in the refrigerant loop to compress the refrigerant fluid;
    a condenser connected in the refrigerant loop to receive the compressed refrigerant fluid from the compressor and condense the compressed refrigerant fluid;
    a heat transfer component connected in the refrigerant loop to receive the condensed refrigerant fluid from the condenser;
    a bypass path extending between an output side of the compressor in the refrigerant loop and an input side of the heat transfer component in the refrigerant loop to pass the compressed refrigerant fluid from the compressor to the heat transfer component;
    a bypass valve connected in the bypass path; and
    a control circuit in communication with the bypass valve, the control circuit configured to open the bypass valve to allow the compressed refrigerant fluid to pass to the heat transfer component thereby increasing the refrigerant fluid provided to the heat transfer component and enabling the speed of the compressor to remain steady or increase to a level to prevent a reduction in lubrication and/or system efficiency.

2. The refrigeration system of claim 1 further comprising a coolant loop arranged to allow a flow of a coolant fluid, the heat transfer component connected in the coolant loop to transfer heat from the coolant fluid to the condensed refrigerant fluid.

3. The refrigeration system of claim 2 further comprising a thermal load component configured to connect in the coolant loop and transfer heat to the coolant fluid in the coolant loop to cool the thermal load component.

4. The refrigeration system of claim 3 wherein the control circuit is configured to control a state of the bypass valve based on the heat transferred from the thermal load component.

5. The refrigeration system of claim 4 further comprising a motor in communication with the control circuit and the bypass valve, the motor configured to change the state of the bypass valve in response to instructions by the control circuit.

6. The refrigeration system of claim 2 wherein the control circuit is configured to determine a temperature of the coolant fluid and open the bypass valve in response to the determined temperature being less than or equal to a defined temperature threshold.

7. The refrigeration system of claim 6 wherein the control circuit is configured to close the bypass valve in response to the determined temperature being greater than the defined temperature threshold.

8. The refrigeration system of claim 1 further comprising an electronic expansion valve connected in the refrigerant loop between the condenser and the heat transfer component.

9. The refrigeration system of claim 8, wherein the control circuit is configured to control a state of the electronic expansion valve based on one or more parameters of the refrigeration system, and further comprising a motor in communication with the control circuit and the electronic expansion valve, the motor configured to change the state of the electronic expansion valve in response to instructions by the control circuit.

10. The refrigeration system of claim 9 wherein the compressor includes a variable speed compressor.

11. The refrigeration system of claim 1 wherein the heat transfer component includes an evaporator.

12. The refrigeration system of claim 1 wherein the control circuit is configured to determine a speed of the compressor and open the bypass valve in response to the determined speed being less than a defined speed threshold.

13. The refrigeration system of claim 1 wherein the control circuit is configured to determine a speed of the compressor and open the bypass valve in response to the determined speed being about equal to or less than a defined speed threshold.

14. A refrigeration system comprising:
    a compressor configured to compress a refrigerant fluid;
    a condenser configured to receive the compressed refrigerant fluid from the compressor and condense the compressed refrigerant fluid;
    a heat transfer component configured to receive the condensed refrigerant fluid from the condenser;
    a bypass valve between an output side of the compressor and an input side of the heat transfer component, the bypass valve openable to allow the compressed refrigerant fluid to bypass the condenser and pass from the compressor to the heat transfer component via the bypass valve when opened; and
    a control circuit in communication with the bypass valve, the control circuit configured to open the bypass valve to thereby allow the compressed refrigerant fluid to bypass the condenser and pass from the compressor to the heat transfer component via the opened bypass valve;

wherein the refrigeration system is configured such that the flow of the compressed refrigerant fluid from the compressor to the heat transfer component via the opened bypass valve increases the refrigerant fluid provided to the heat transfer component and enables the speed of the compressor to remain steady at or increase to a level to prevent a reduction in lubrication and/or system efficiency.

15. The refrigeration system of claim 14, wherein the refrigeration system is configured such that the flow of the compressed refrigerant fluid from the compressor to the heat transfer component via the opened bypass valve artificially increases a load on the refrigeration system.

16. The refrigeration system of claim 15, wherein the refrigeration system is configured such that the artificially increased load on the refrigeration system enables the speed of the compressor to remain steady at or increase to the level to prevent the reduction in lubrication and/or system efficiency.

17. The refrigeration system of claim 14, wherein the control circuit is configured to determine a speed of the compressor and to open the bypass valve in response to the determined speed being less than a defined speed threshold.

18. The refrigeration system of claim 17, wherein the refrigeration system is configured such that:
the flow of the compressed refrigerant fluid from the compressor to the heat transfer component via the opened bypass valve artificially increases a load on the refrigeration system; and
the artificially increased load on the refrigeration system enables the speed of the compressor to remain steady at or increase to the level to prevent the reduction in lubrication and/or system efficiency.

19. The refrigeration system of claim 14, wherein the control circuit is configured to determine a speed of the compressor and to open the bypass valve in response to the determined speed being equal to a defined speed threshold.

20. The refrigeration system of claim 19, wherein the refrigeration system is configured such that:
the flow of the compressed refrigerant fluid from the compressor to the heat transfer component via the opened bypass valve artificially increases a load on the refrigeration system; and
the artificially increased load on the refrigeration system enables the speed of the compressor to remain steady at or increase to the level to prevent the reduction in lubrication and/or system efficiency.

* * * * *